United States Patent
Rathunde et al.

(10) Patent No.: US 6,920,320 B2
(45) Date of Patent: Jul. 19, 2005

(54) METHOD AND APPARATUS FOR STABLE CALL PRESERVATION

(75) Inventors: Dale F. Rathunde, Geneva, IL (US); Antonio J. M. Ransom, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 460 days.

(21) Appl. No.: 10/260,604

(22) Filed: Sep. 30, 2002

(65) Prior Publication Data
US 2004/0203833 A1 Oct. 14, 2004

(51) Int. Cl.[7] .................................................. H04Q 7/20
(52) U.S. Cl. ............................ 455/422.1; 455/414.1; 455/442; 455/403; 455/453; 379/112.02; 379/157; 370/328; 370/338
(58) Field of Search ......................... 455/422.1, 414.1, 455/442, 403; 379/112.02, 157; 370/328, 338

(56) References Cited

U.S. PATENT DOCUMENTS

| | | | |
|---|---|---|---|
| 6,058,490 A | 5/2000 | Allen et al. ..................... 714/9 |
| 6,148,324 A | 11/2000 | Ransom et al. ............. 709/105 |
| 6,522,732 B1 * | 2/2003 | Pullen et al. .......... 379/112.02 |
| 2001/0052006 A1 * | 12/2001 | Barker et al. ............... 709/223 |
| 2002/0114352 A1 * | 8/2002 | Ozluturk ..................... 370/477 |
| 2004/0242259 A1 * | 12/2004 | Ozluturk et al. ............ 455/522 |

* cited by examiner

*Primary Examiner*—Sonny Trinh
*Assistant Examiner*—Khai Nguyen (57) ABSTRACT

A method and apparatus for preserving call-state information on a wireless communication system is provided. The method includes periodically replicating stable call call-state information between a first and second processor via a network connection. The method also includes performing a transient clear to drop transient calls in existence at the time of an outage of an active first RCS application process or processor. The method also includes forming network-based active call facilities paths to a second RCS application instance and transitioning the second RCS application instance to an active state thereby avoiding a service interruption for the stable calls previously handled by the active first RCS application instance.

20 Claims, 4 Drawing Sheets

METHOD AND APPARATUS FOR STABLE CALL PRESERVATION

BACKGROUND OF THE INVENTION

The present invention relates to cellular wireless communication networks also known as cellular wireless communication systems. More particularly it relates to a method and apparatus for preserving call-state information to avoid service interruptions for stable calls.

A typical cellular wireless communication systems is made up of a plurality of cells each occupying a separate geographical area. Each cell usually includes a cell site having known hardware necessary for providing wireless communication coverage to a plurality of wireless terminals within the cell. Examples of such hardware can include, but is not limited to, radio frequency transmitters and receivers, antenna systems, interface equipment and power sources.

The cell site typically communicates with one or more active processes having application processors which handle access system resources such as radios, channels and the like for the cell. Software applications, known as Radio Control Software (RCS), running on these application processors manage the associated call and maintenance traffic to, from, and within the cell. Several cell sites typically communicate with a Mobile Switching Center (MSC) which switches cellular calls to wired central offices to enable mobile terminals to communicate with phones over the Public Switched Telephone Network (PSTN).

The PSTN offers users the benefit of high availability of service which means call service interruptions are rare. Interruptions in wireless communication service can be created when hardware and/or software fails or is taken off line for repairs, maintenance, updates, etc. As the use of wireless systems grows and the capacities of wireless systems increase, end users and service providers alike desire improvements in service availability.

In an effort to achieve high availability, the processes are paired in an active/standby arrangement using an active RCS application processor mated to a standby RCS application processor. When a fault occurs on the active process, or maintenance is to be performed, the standby process is elevated to the active role in an effort to continue providing service. It is desirable to not drop calls during this procedure.

Conventional cellular wireless communication systems using mated processor pairs have provided high availability by using specialized fault tolerant hardware. These specialized application processors are tightly coupled, connected together by an update bus which updates the memories of the active and standby processors. It is desirable to reduce hardware costs by using general purpose commercial processors without specialized fault tolerant hardware such as the update bus.

Typically, when the active process is interrupted in the high availability architecture system, a stable clear is performed to clear the stable calls being handled by the active process and the active application is relocated to another processor. A stable call is a call that is not waiting for any internal messages. Calls being setup or in hard handover between cell cites are transient calls. For CDMA with an average 100 second call hold time approximately 1 per cent of calls become transient every second. Not only are stable calls dropped, but often the subtending cells must reboot after being disconnected from the application processor and this procedure adds to the recovery duration of the dropped calls. It is, therefore also desirable to reduce the recovery time for any calls which are dropped.

SUMMARY

A method and apparatus for stable call preservation on a wireless communications system is provided.

In accordance with a first aspect of the invention, the method includes running a first Radio Control Software application instance in active operation on the first application processor communicating with a group of the cells via network-based active call facilities paths for handling the radio control signaling and Office Administration & Maintenance of the group of the cells. The method also includes running a second RCS application instance in standby operation on a second application processor and replicating stable call call-state information between the first processor and the second processor via a network connection.

In accordance with a second aspect of the invention, the method includes performing a transient clear after the outage to drop transient calls in existence at the time of the outage.

In accordance with another aspect of the invention, the method includes forming network-based active call facilities paths between the second RCS application instance and the group of the cells, and transitioning the second RCS application instance to an active state for handling the radio control signaling of the group of the cells thereby avoiding a service interruption for the stable calls previously handled by the active first RCS application instance.

A wireless communication system capable of preserving call-state information is provided. The wireless communications system includes a plurality of cells for providing wireless communication coverage to a plurality of wireless terminals.

In accordance with one aspect of the invention the wireless communications system includes a first application processor having call-state data buffers and running a first active Radio Control Software (RCS) application instance communicating with a group of the cells via network-based active call facilities paths for handling the radio control signaling and Office Administration & Maintenance (OA&M) for the group of the cells.

In accordance with another aspect of the invention the wireless communications system includes a second application processor connected to the first application processor via a first network connection, the second application processor having call-state data buffers and running a standby RCS application instance;

In accordance with another aspect of the invention the wireless communications system includes replicating means for replicating stable call call-state information between the first processor and the second processor via the network connection before an outage of at least one of the first application processor and the first active RCS application instance.

In accordance with another aspect of the invention the wireless communications system includes means for performing a transient clear after the outage to drop transient calls in existence at the time of the outage.

In accordance with another aspect of the invention the wireless communications system includes switching means for forming network-based active call facilities paths between the second RCS application instance and the group of the cells; and In accordance with another aspect of the invention the wireless communications system includes transitioning means for transitioning the standby RCS application instance to the active state for handling radio control signaling and OA&M for the group of the cells to avoid a service interruption for stable calls previously handled by the active first RCS application instance.

DETAILED DESCRIPTION

It is to be understood that the specific devices and processes illustrated in the attached drawings, and described in the following specification are simply exemplary embodiments of the inventive concepts defined in the appended claims. As used herein, unless stated otherwise, the term process refers to one or more software applications and one or more associated application processors for running the software applications.

Figure 1:
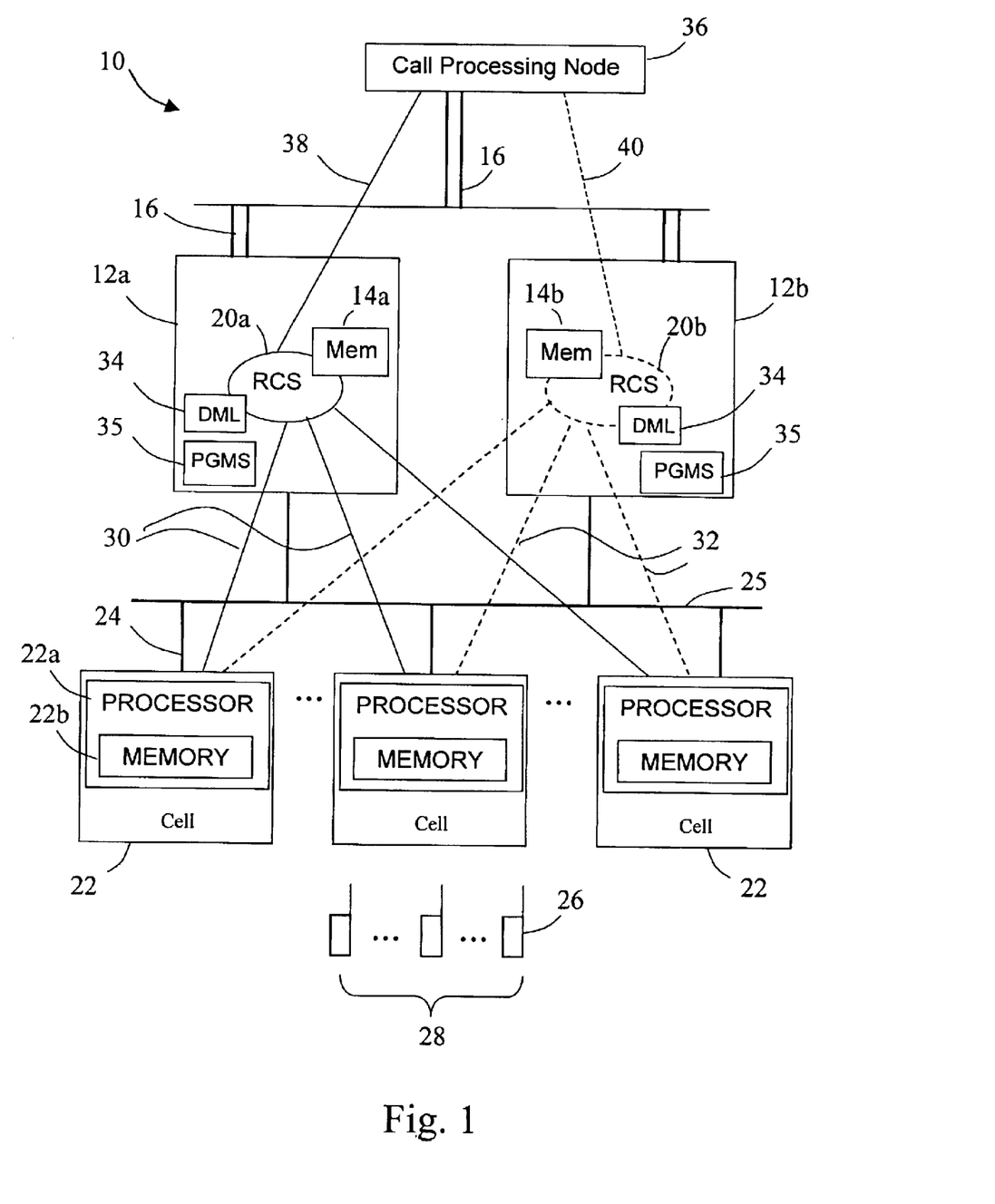
FIG. 1 is a diagram illustrating a portion of the wireless communications system in accordance with the invention.

Referring now to FIG. 1 a portion of a wireless communications system is shown generally at 10 having a plurality of application processors 12, such as a first application processor 12a and a second application processor 12b as shown. The application processors 12 can be located in the same location, for example at a Mobile Switching Center (not shown), in the same frame or in separate frames, or alternatively, they can be distributed across several locations. The application processors 12 can be duplex-processors, FT systems, high availability processors, imbedded processors, or any other suitable known processors. The application processors 12a, 12b each include memories, 14a and 14b respectively, also known as call-state data buffers for holding call-state information.

The application processors 12 are connected together for communication in a loosely coupled arrangement by a network connection 16. The network connection 16 may be any suitable known network connection including but not limited to a Local Area Network (LAN) or Wide Area Network (WAN), using any suitable known interconnect including but not limited to, Ethernet, T1, ATM, Infiniband or any other known interconnect. Any suitable addressing schemes, such as, for example, Internet Protocol addressing schemes, can be used to direct information to the proper location on the network 16.

The wireless communication system 10 includes a plurality of instances of Radio Control Software (RCS), also known as RCS application instances 20, running on one or more of the application processors 12. The RCS can use any known programming language and can be Code Division Multiple Access (CDMA), Time Division Multiple Access (TDMA), Universal Mobile Telecommunications System (UMTS), or any other suitable radio control format.

Each RCS application instance 20 is connected to one or more cells 22 via facility connections 24 which can be any suitable connections including but not limited to E1 or T1 connections, running LAPD over Frame Relay or IP over ATM or any other suitable hardware and protocol. The cells 22 include cell processors 22a and cell memories 22b which can be any suitable known processors and memories.

Each RCS application instance 20 is capable of providing communication services, including handling the call traffic, for groups of wireless communication terminals 26, hereinafter called call groups 28, one of which is shown in FIG. 1, via the cells 22. A plurality of different call groups 28 can communicate using the wireless communication system 10. It should be understood that the call traffic of the call groups 28 can include any known wireless communication traffic, including voice and/or data. The wireless terminals 26 can include cellular phones, or other wireless communication devices including those transmitting and receiving data.

The call group 28 can include the wireless terminals 26 supported by one cell 22 or a plurality of cells as shown. The cells 22 can be conventional cells, modular cells, or microcells which typically cover a smaller geographical area than conventional cells, or any combination thereof. An example, which should not be considered as limiting, includes an RCS application instance 20a handling the call traffic for a plurality of Flexent microcells manufactured by Lucent Technologies, Inc. Alternatively, the call group 28 can include the wireless terminals 26 supported by only a portion of a cell 22.

The RCS application instances 20 attempted to be brought up active first, for example when the processor(s) 12 are reinitialized, are typically designated as primary application instances 20a. Each primary application instance 20a running on an application processor 12a can be associated with a secondary application instance 20b on a second application processor 12b in an active-standby relationship. The active-standby pair of processors 12 and/or RCS application instances 20 can communicate with each other over the network connection 16 using any known communication protocol including but not limited to TCP/IP or COBRA.

RCS application instances actively providing communication services for the call groups 28 are known as active instances. In FIG. 1, the primary RCS application instance 20a is designated as the active application instance using solid lines. The secondary RCS application instance 20b is operating as a standby RCS application instance and designated as such using dashed lines. Upon an outage of the active primary RCS application instance 20a, the standby RCS application 20b instance is transitioned to an active state, thereby becoming the active RCS application instance as described below.

The primary and secondary RCS application instances 20a and 20b can be pre-designated as mates in a fixed processor pair arrangement with one processor 12a running an active application instance and another processor 12b running a standby RCS application instance. Alternatively, the application processors 12a and 12b may form part of an application cluster having flexible pairing capabilities. The flexible pairing capabilities enable each active RCS application instance to be mated with any other suitable secondary RCS instance running on a different processor in the cluster to form the active-standby relationship.

The facility connections 24 are used to connect the processors 12a, 12b to the cells 22 to form call facilities paths. The facility connections 24 can include two signaling paths between each of the application processors 12 and the cells 22 to provide a redundancy which allows either RCS application instance, active or standby, to communicate with its associated cells. The facility connections 24 can be unique DSO's on known redundant E1/T1 lines. These lines can be switched via known switching means 25 such as an E1 switch, although any other suitable known switching means can be used.

The facility connections 24 connect the processor 12*a* running the active RCS application instance with the cells 22 to form active network-based call facilities paths as designated with solid lines 30. Call traffic and other information used by the active RCS application instance when providing communication services to the cells 22 is transferred over the active call facilities paths 30. The facility connections 24 also connect the processor 12*b* running the standby RCS application instance with the cells 22 to form standby network-based call facilities paths as designated with dashed lines 32. The RCS application instances 20*a* and 20*b* will not both be active at the same time. Rather the call facilities paths are determined to be the active call facilities paths 30 when active RCS application instance (20*a* or 20*b*) transfers call traffic and other information to the cells 22 via the path.

Replicating means 34 are provided for replicating stable call call-state information between the first processor 12*a* and the second processor 12*b* via the network connection 16 as described below. The replicating means 34 can include software implementations such as a Data Marking Library (DML), also known as a Data Replication Service (DRS), as described in co-pending Lucent Technologies patent application Ser. No. 10/158,999 filed May 31, 2002, which is hereby incorporated herein by reference. Any other suitable software implementation which can be used to replicate the stable call call-state information between the first and second application processors can be used. Alternatively, the replicating means 34 can include hardware implementations for replicating the stable call call-state information. For example, known intelligent Ethernet cards or known reflective memory cards can be used.

Figure 2:
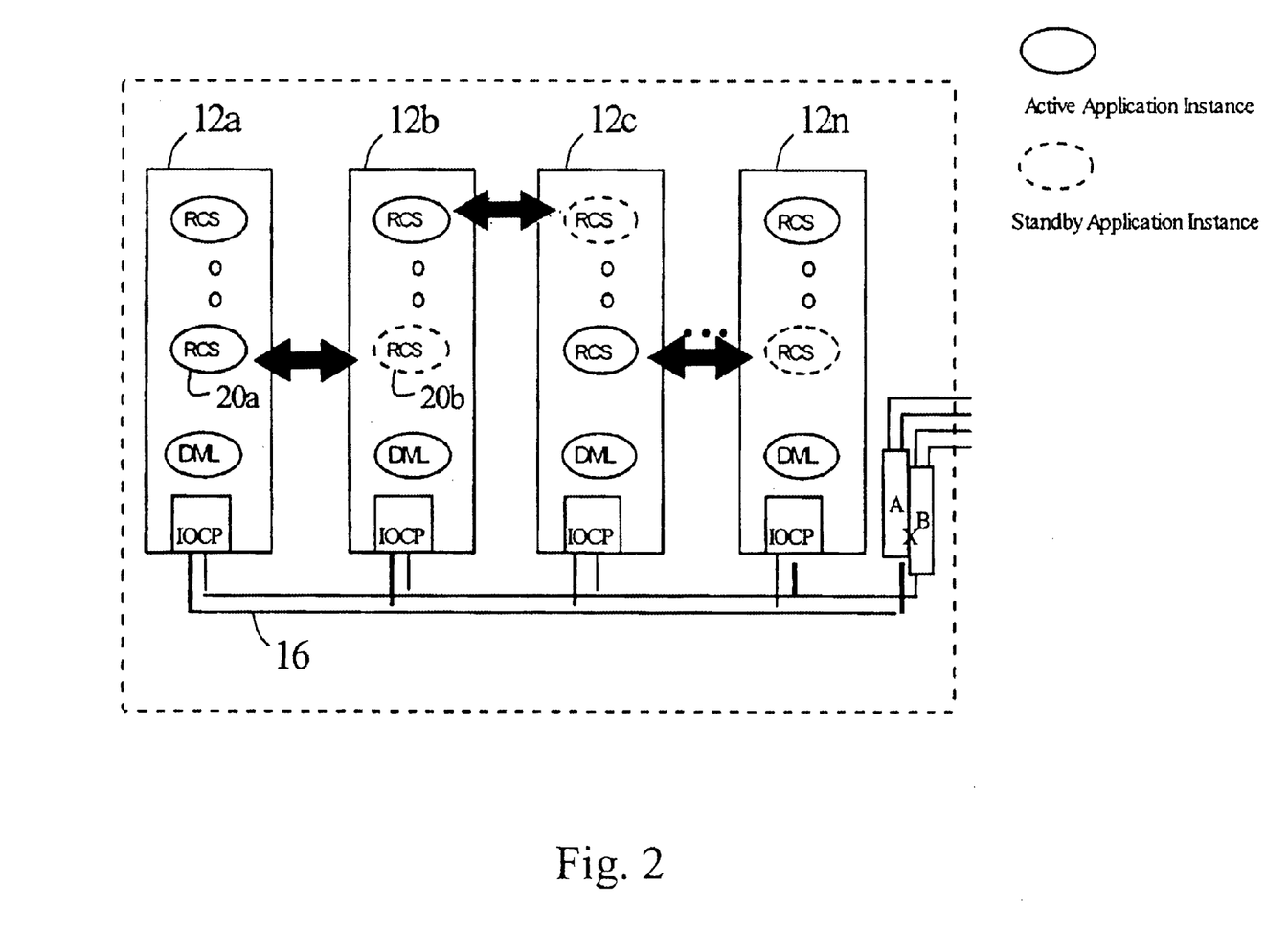
FIG. 2 is an alternate embodiment of the wireless communications system illustrating multiple RCS applications instances provided on an application processor.

Referring to FIG. 2, one or more of the application processors 12*a*–12*n* can each run zero, one or a plurality of separate RCS application instances 20 with each RCS application instance handling the call traffic for a different call group 28. Therefore a single processor 12*a* can run a plurality of separate RCS application instances 20, each of which can handle smaller call groups 28 so that individual RCS application software updates or RCS instance failures can be more localized to achieve high availability for subtending cells.

Each application processor 12 runs Process Group Management Software (PGMS) shown at 35, for performing recovery operations upon the existence of an outage. Such operations insure that the standby RCS application instance assumes the active role handling stable calls where the first active RCS application instance left off. The PGMS includes fault detection means for determining in impending outage of the primary processor 12*a* and/or the first active RCS application instance 20*a*. The PGMS can determine the impending outage in any suitable known manner, such as for example as described in the Lucent Technologies Inc. patent U.S. Pat. No. 6,058,490 which is hereby incorporated by reference herein. The PGMS 35 monitors the application processor 12 and the RCS application instance 20 for any state change indicating an outage. The PGMS 35 can also use any suitable known hardware, including but not limited to commercial chassis management cards, to monitor each processor to detect outage conditions or unhealthy conditions leading to an outage. The known hardware may be external to the PGMS.

Alternatively, the PGMS can determine the impending outage in a manner similar that performed by the DML as described in the copending Lucent Technologies patent application Ser. No. 10/158,999 incorporated by reference as described above.

Upon determining an outage, the PGMS 35 signals the corresponding standby RCS application instance 20*b* resume operation in an active state using any suitable known communication mechanism, including but not limited to any IPC (Inter-Process Communication) mechanism such as OS signals, OS memory message queues, CORBA messages, TCP/IP messages, etc.

Figure 4:
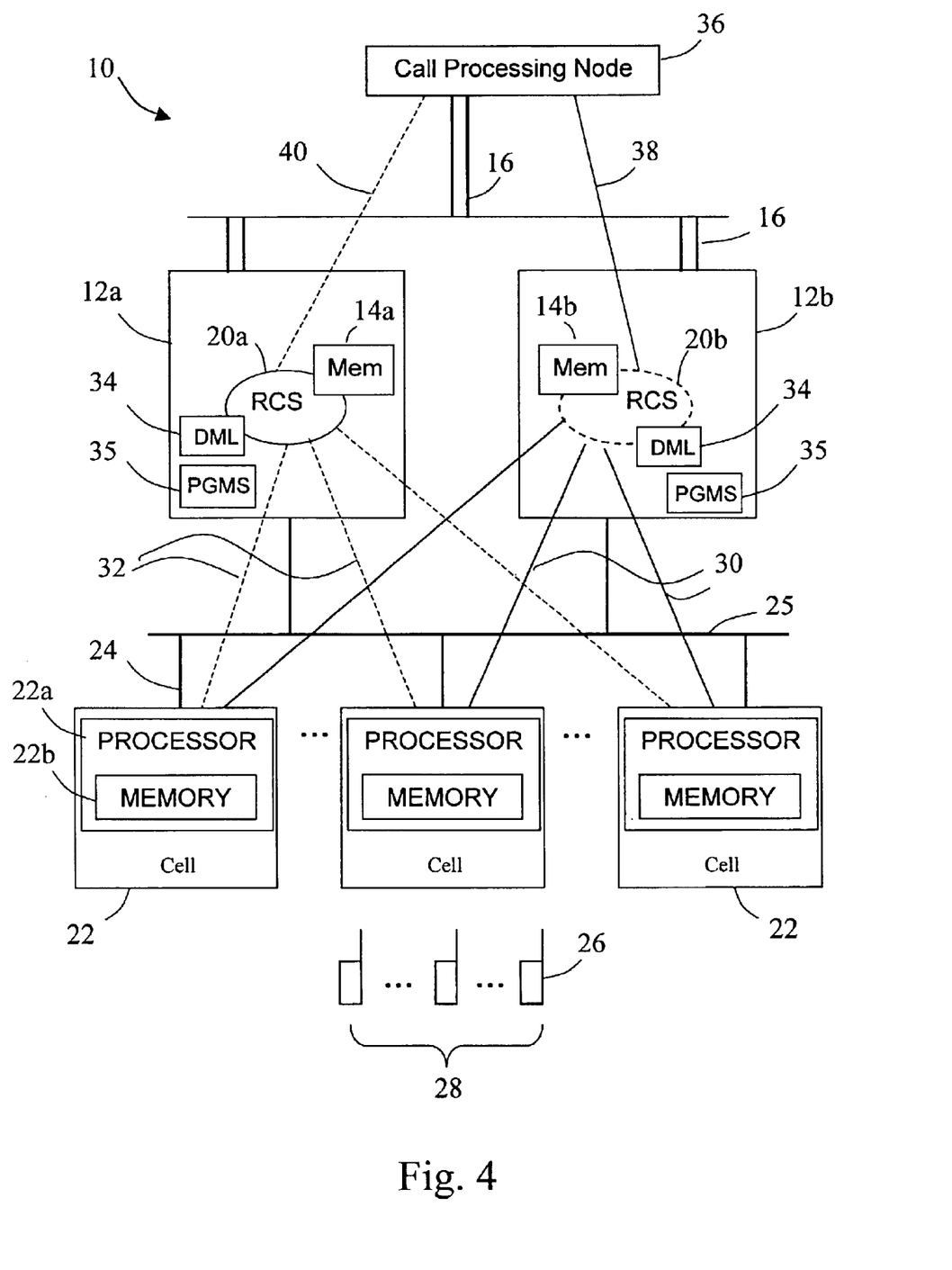
FIG. 4 is a diagram illustrating the transition of the second RCS application instance to an active state in accordance with the invention.

The PGMS forms switching means for forming the network-based active call facilities paths between the second RCS application instance and the group of cells (as shown in FIG. 4) upon an outage of the primary active RCS instance 20*a* and/or first processor 12*a*.

The communications system 10 also includes transition means, which can be included in the PGMS fault detection and recovery escalation system, for transitioning the standby RCS application instance 20*b* from standby state to the active state when it detects the active instance 20*a* outage.

The communication system also includes a Call Processing Node (CPN) 36 for handling the call model for the TDMA, CDMA, or UMTS wireless communications system 10. It has access to subscribed data records and features in a database stored in the communications system 10. The communications system 10 can include more than one CPN 36 though only one is shown in FIG. 1 for simplicity.

The call processing node 36 communicates with the application processors 12 via the network 16 to form call processing paths. The call processing paths include an active call processing path shown by the solid line 38 to the application processor running the active RCS application instance (processor 12*a* in FIG. 1) and a standby call processing path shown by the dashed line 40 to the application processor running the standby RCS application instance (processor 12*b* in FIG. 1). The CPN 36 can be disposed at the same location as the application processors 12*a*, 12*b*, and can even run on the same application processor(s) as the RCS application instance, or the CPN can be at a different location.

The call processing node 36 orchestrates the call setup, hand-offs, and the tear down between other cells in the same system and other MSCs. When a call comes in from a local cell or outside system it is assigned to a call processing node based on the load of the system. It sends messages to the active RCS application instance to find a wireless terminal 26 in the network 10 in a process known as paging, and administers a call waiting tone to be sent to the wireless terminal 26 if a call involving that terminal is already in progress.

The wireless communication system is typically equipped with multiple CPNs 36, and each CPN has a separate instance of call processing software and its own complete set of data bases. Each CPN is capable of handling any call that enters the system 10. Each call that enters the system is assigned to a particular CPN 36. Each CPN has a local call status list that keeps track of the calls that are being handled by that CPN 36.

Figure 3:
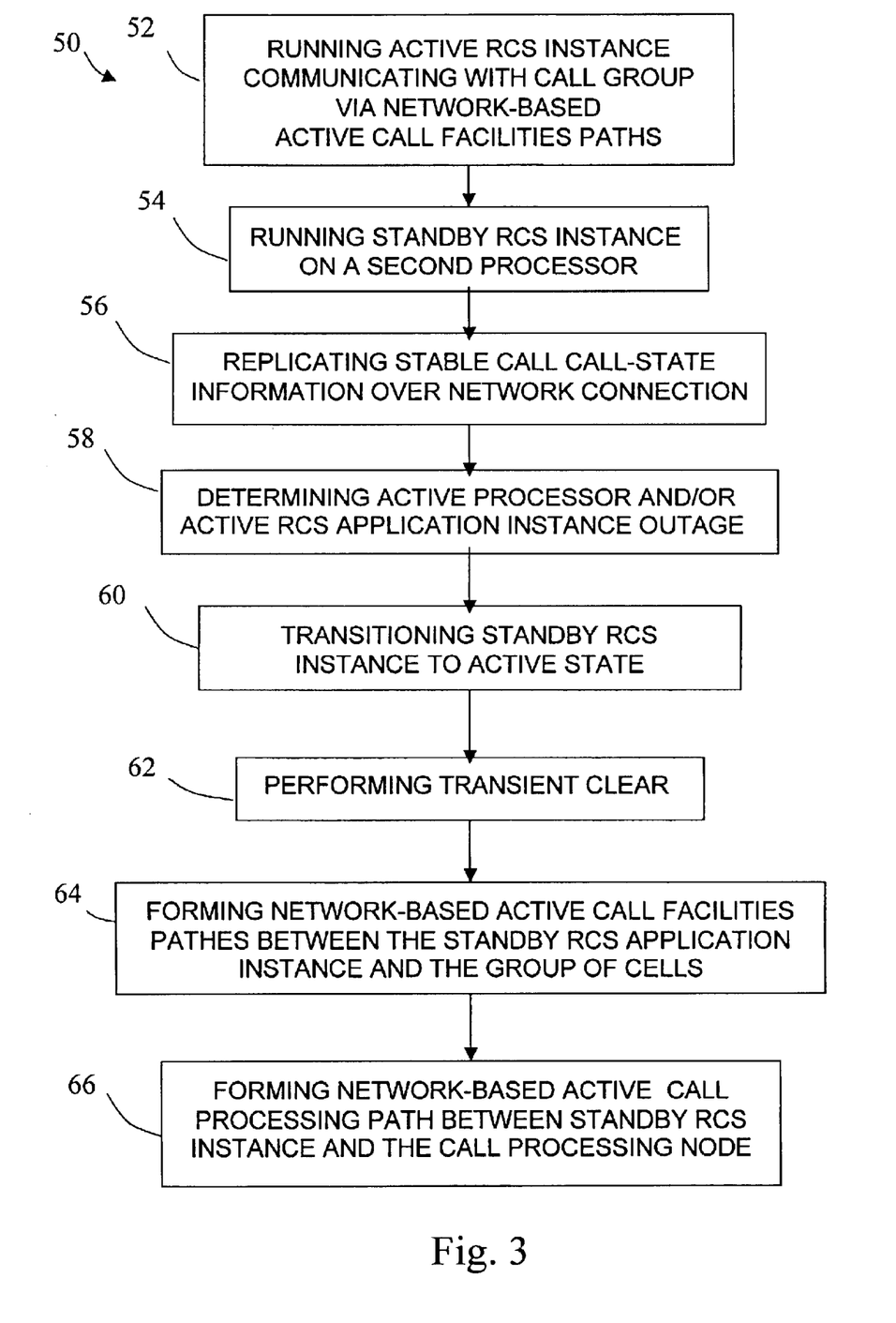
FIG. 3 is a block diagram illustrating a method of preserving stable calls on a wireless communications system in accordance with the invention.

Referring now to FIG. 3, a method of preserving stable call-state information in a wireless communication system is shown at 50. The wireless communication system includes a plurality of cells for providing wireless communication services to wireless terminals, and a first and second application processor each having host memories. The method includes the steps of running a first RCS software application instance in active operation on the first application processor at 52. The active RCS software application instance communicates with a group of the cells via network-based active call facilities paths for handling the radio control signaling and Office Administration and Maintenance (OA&M) of the group of the cells. The method further includes running a second RCS application instance in standby operation on a second application processor at 54.

The method also includes replicating stable call call-state information at 56 from the host memory of the processor running the active RCS application instance to the host memory of the processor running the standby RCS application instance over the network connection 16. The replication at step 56 preferably occurs on an ongoing periodic basis. An example of a period can be 3 to 10 seconds although any suitable time period can be used.

The ongoing periodic replication ensures that the current call-state information is available to the standby application instance when it is transitioned to the active operation as described below. The replicated call-state information can be read into the processor space from the memory 14b or transferred directly into the processor space during a hot standby mode.

In accordance with the invention, the stable call call-state information is replicated. That is, call-state information for stable calls such as calls already established and calls not being handed off between cells. Any suitable known stable call call-state information can be replicated.

Every call supported by the RCS application instance, including stable calls and transient calls, is represented by a call record. The call record has information about the wireless terminal 26, the radio resources that are in use, physical trunks used to connect from the cell 22 to the public switched network etc, and the state of the call indicating whether the call is stable or transient. The call-state information can also include call origination, soft hand-off, and release information in the form of software data structures that have changed for the stable call events. These data structure can include, but are not limited to, call registers, neighbor list, sector list, channel element list, traffic element channel list, etc.

The call state information is typically stored in call-state data buffers, or host memories 14a, in the application processor 12a on which the active RCS application instance is running. The stable call call-state information is periodically replicated into the host memory 14b of the second application processor 12b via the network connection 16, and thus before the outage of the active RCS application instance and/or the first application processor 12a.

The replication step includes copying the stable call call-state information stored by the first processor 12a and/or the first processor memory 14a which is used by the active RCS application instance 20a and transferring it to the second processor 12b and/or second processor memory 14b for use by the standby RCS application instance when the standby RCS application instance is transitioned to the active state as described below.

The DML software orchestrates the replication of the call-state information on a periodic basis so that this information is in the standby memory when the outage occurs thereby avoiding a service interruption to the stable calls. The frequency of the periodic replication can be adjusted according to application, data size, network bandwidth and CPU limitations as described in the copending Lucent Technologies patent application Ser. No. 10/158,999 incorporated by reference as described above, or in any other suitable known manner. The application may also break up its memory targeted for replication to allow different portions to be moved at differing frequencies.

Alternatively, the call-state information can be replicated at step 54 from the active RCS application instance to the standby RCS application instance in any other suitable known manner. For example, the call-state information can be replicated by copying memory via an intelligent ethernet card or using reflective memory cards.

The primary processor 12a running the active RCS application instance and/or the active RCS application instance itself can incur an outage affecting the service for the associated one or more call groups 28 for a variety of reasons. The primary processor 12a may undergo an unplanned outage such as a hardware failure which can include, but is not limited to, a processor failure, memory failure, a disk failure, a network failure, etc. Other unplanned processor outages can include software failures such as operating system failures, or the like. Alternatively, the primary processor 12a may undergo a planned outage which may be necessitated by maintenance or repair. Similarly, the active RCS instance may undergo an unplanned outage such as a failure or a planned outage needed for software updates or the like.

Impending unplanned processor outages and/or unplanned active RCS application instance outages are determined, that is detected, at 58 in a manner as described above, or in any suitable known manner in to preserve call-state information and avoid service interruptions for stable calls.

Impending planned active processor outages and/or planned active RCS application instance outages are determined in any suitable known manner at 58 in order to complete the remaining steps described below to preserve call-state information and avoid interrupted service for stable calls.

The method also includes transitioning the standby RCS application instance to an active state at 60 after an outage has been determined for handling the radio control signaling and OA&M of the group 28 to avoid a service interruption for stable calls previously handled by the first active RCS application instance. This is shown in FIG. 4 using solid lines for the RCS application instance 20b which is now transitioned to the active state.

For first and second application processors configured as a fixed pair of active/standby processors the outage may terminate the replication traffic between the pair of processors if the replication step is occurring at the time of the outage to reduce the likelihood of corrupting the stable call call-state information. Alternatively, for first and second application processors configured as part of a cluster with flexible pair capabilities, only a fraction of the replication traffic in the cluster, that is the stable call call-state information applicable to the active RCS application instance incurring the outage, is terminated.

During the transition to active, the first active RCS application instance can, via the DML 34, determine if a valid buffer 14b is available in the second processor 12b. If it is available, the application can read the buffer contents from system memory into the application's process space (if not already direct memory transferred) and complete process initialization. The newly promoted active RCS application instance, 20b in FIG. 4, can take over processing quickly since the most recent running state is in local memory due to the replicating step of 56.

A double buffering approach can be managed by the DML whereby the data stream received from the sending processor is alternated between local buffers in the DML receivers memory space. This is to insure that an application processor failure on the sending side does not invalidate any portion(s) of the previous (complete) application data transferred and stored by a receiving DML daemon.

The method also includes performing a transient clear at 62 to remove transient call call-state information from the group of subtending cells 28. Transient calls can be newly made calls that are still being setup, or calls that are in handover, that is being handed off from one cell to another. During the transient clear, the newly promoted active RCS application instance 20b sends a message to the cells 22 and the cells performs the transient clear.

When a call is transient, the system 10 is waiting on an external source to help transition the call to its next state. As an example, when performing a soft handoff, a message is sent to the cell 22 to allocate additional radio resources. The cell 22 to responds back to complete the transition. Should an outage occur before the response is received by the RCS application instance, there is a strong possibility that the response will get lost or that the response will not be processed in a timely manner and the call can be corrupted. To preserve the integrity of the entire system, all calls that are in a transient state when the outage occurs are dropped during the transient clear at step 62.

The transient clear can be accomplished in any known manner. In one example, the transient call call-state information is retrieved from the call records described above including information about what interfaces to the public switched network were in use for the transient calls. Then, messages are sent to the call processing nodes 36 to release those resources and to stop billing the subscriber for this call. Upon receiving these messages, the call processing nodes 36 release the transient call interfaces to the Public Switched Network.

Also, all information about radio resources that were used by the transient calls is retrieved from the call records and the subtending cells 22 release those resources. Finally, all context about the transient calls are removed from the subtending cell processors 22a and/or memories 22b in any suitable known manner. The newly promoted active RCS application instance, shown using solid lines in FIG. 4, can also request Call Processing audits to run in elevated mode to clean up the system 10 for the dropped calls. The typical recovery action for such errors is to release these calls.

Referring now to FIGS. 3 and 4, the method also includes forming network-based active call facilities paths 30 between the second RCS application instance 20b and the group of the cells at 64 to enable the second RCS application instance to handle the radio control signaling and OA&M of the group of the cells when it is transitioned to the active state as described below. In FIG. 4, the active call facilities paths 30 are shown formed between the second processor 12b and the cells 22.

The method also includes forming network-based active call processing paths 38 at 66 between the second application processor 12b and the call processing node 36. The active call processing path 38 to the second application instance 20b shown in FIG. 4 can be formed in any suitable manner. For example, the call processing node 36 can include a routing table defining the application processor used in the call processing path. Therefore, step 66 can include the standby RCS application instance 20b communicating with the call processing node 36 and updating the routing table to use the second application processor 12b. Alternatively, the Internet Protocol address of the active RCS instance 20a may move between the first processor 12a and the second processor 12b, following the active RCS instance so no update to the call processing node 36 is needed.

The step of performing a transient clear 62 can be performed before, during or after steps of forming the network-based active call facilities paths 64 and forming the network-based active call processing path 66.

When the repair, maintenance, software update, etc. causing the outage is completed, the primary RCS application instance 20a can be transitioned back to active operation and the secondary RCS application instance 20b can be transitioned back to the standby state as shown by FIG. 1. This is accomplished using a similar data replication procedure as described above, this time replicating the stable call call-state data from the active secondary RCS application instance 20b to the primary RCS application instance 20a.

We claim:

1. A method for preserving call-state information on a wireless communication system having a plurality of cells for providing wireless communication services to wireless terminals, and a first and second application processor each having host memories, the method comprising:

running a first Radio Control Software (RCS) application instance in active operation on the first application processor communicating with a group of the cells via network-based active call facilities paths for handling the radio control signaling and Office Administration & Maintenance (OA&M) of the group of the cells;

running a second RCS application instance in standby operation on the second application processor;

replicating stable call call-state information between the first processor and the second processor via a network connection before an outage of at least one of the first processor and the first RCS application instance;

transitioning the second RCS application instance to an active state for handling the radio control signaling of the group of the cells thereby avoiding a service interruption for the stable calls previously handled by the active first RCS application instance;

performing a transient clear after the outage to drop transient calls in existence at the time of the outage; and forming network-based active call facilities paths between the second RCS application instance and the group of the cells.

2. The method for preserving call-state information defined in claim 1 further comprising:

providing a call processing node communicating with the first processor via a network-based active call processing path for call processing; and forming an active network-based call processing path between the call processing node and the second RCS application instance after the outage.

3. The method for preserving call-state information defined in claim 2 wherein the call processing node includes a routing table defining the application processor used in the call processing path and the step of forming a network-based active call processing path further comprises the standby processor communicating with the call processing node and updating the routing table to include the second processor.

4. The method for preserving call-state information defined in claim 2 wherein the cells in the group of cells include cell processors and cell memories for storing transient call call-state information and the transient clear includes removing the transient call call-state information from the cell processors and cell memories.

5. The method for preserving call-state information defined in claim 2 wherein the step of performing the transient clear further comprises the call processing node releasing the transient call interfaces to the Public Switched Network.

6. The method for preserving call-state information defined in claim 2 wherein the step of performing the transient clear further comprises the cells releasing the radio resources used by the transient calls.

7. The method for preserving call-state information defined in claim 1 wherein the replicating step comprises transferring the replicated stable call call-state information over a Local Area Network.

8. The method for preserving call-state information defined in claim 1 wherein the replicating step comprises the first processor controlling the frequency of data replication.

9. The method for preserving call-state information defined in claim 1 wherein the replicating step comprises adjusting the replication frequency according to the application.

10. The method for preserving call-state information defined in claim 1 wherein the replicating step comprises adjusting the replication frequency based on the size of the data replicated.

11. The method for preserving call-state information defined in claim 1 wherein the stable call call-state information is stored in data buffers and the replicating step comprises replicating different portions of the data buffers at different frequencies.

12. The method for preserving call-state information defined in claim 1 further including a plurality of active RCS application instances communicating with different groups of the plurality of cells for handling the radio control signaling and OA&M and a plurality of standby RCS application instances corresponding to the active RCS application instances.

13. A wireless communication system capable of preserving call-state information comprising:

a plurality of cells for providing wireless communication coverage to a plurality of wireless terminals;

a first application processor having call-state data buffers and running a first active Radio Control Software (RCS) application instance communicating with a group of the cells via network-based active call facilities paths for handling the radio control signaling and Office Administration & Maintenance (OA&M) for the group of the cells;

a second application processor connected to the first application processor via a first network connection, the second application processor having call-state data buffers and running a standby RCS application instance;

replicating means for replicating stable call call-state information between the first processor and the second processor via the network connection before an outage of at least one of the first application processor and the first active RCS application instance;

means for performing a transient clear after the outage to drop transient calls in existence at the time of the outage;

switching means for forming network-based active call facilities paths between the second RCS application instance and the group of the cells; and transitioning means for transitioning the standby RCS application instance to the active state for handling radio control signaling and OA&M for the group of the cells to avoid a service interruption for stable calls previously handled by the active first RCS application instance.

14. The wireless communication system defined in claim 13 further comprising:

a call processing node communicating with the first application processor on a network-based active call processing path; and means for forming an active network-based call processing path between the call processing node and the second RCS application instance after the outage.

15. The wireless communication system defined in claim 13 wherein the first and second application processors are a fixed pair of processors and the outage terminates the replication traffic between the pair of processors.

16. The wireless communication system defined in claim 13 wherein the first and second application processors are part of a cluster configuration of application processors having flexible pairing capabilities.

17. The wireless communication system defined in claim 16 wherein the outage terminates only a fraction of the replication traffic in the cluster.

18. A method for preserving call-state information on a wireless communication system having a plurality of cells for providing wireless communication services to wireless terminals, a first application processor running an active first Radio Control Software (RCS) application instance and second application processor running a standby RCS application instance, the method comprising:

replicating stable call call-state information between the first processor and the second processor via a network connection before an outage of at least one of the first processor and the first RCS application instance;

transitioning the second RCS application instance to an active state for handling the radio control signaling of a group of the cells thereby avoiding a service interruption for the stable calls previously handled by the active first RCS application instance; and performing a transient clear after the outage to drop transient calls in existence at the time of the outage.

19. The method for preserving call-state information defined in claim 18 wherein the cells in the group of cells include cell processors and cell memories for storing transient call call-state information and the transient clear includes removing the transient call call-state information from the cell processors and cell memories.

20. The method for preserving call-state information defined in claim 18 wherein the step of performing the transient clear further comprises the cells releasing the radio resources used by the transient calls.

* * * * *